(12) United States Patent
Lieber

(10) Patent No.: US 8,996,862 B2
(45) Date of Patent: *Mar. 31, 2015

(54) CLIENT DEVICE AND LOCAL STATION WITH DIGITAL RIGHTS MANAGEMENT AND METHODS FOR USE THEREWITH

(71) Applicant: Morega Systems Inc., Toronto (CA)

(72) Inventor: Zeev Lieber, North York (CA)

(73) Assignee: Morega Systems, Inc, Toronto (CA)

( * ) Notice: Subject to any disclaimer, the term of this patent is extended or adjusted under 35 U.S.C. 154(b) by 19 days.

This patent is subject to a terminal disclaimer.

(21) Appl. No.: 13/875,694

(22) Filed: May 2, 2013

(65) Prior Publication Data

US 2013/0246786 A1    Sep. 19, 2013

Related U.S. Application Data

(63) Continuation of application No. 13/027,032, filed on Feb. 14, 2011, now Pat. No. 8,458,459.

(51) Int. Cl.
*H04L 29/06* (2006.01)
*H04L 9/08* (2006.01)
*H04L 9/32* (2006.01)

(52) U.S. Cl.
CPC .............. *H04L 9/0825* (2013.01); *H04L 9/321* (2013.01); *H04L 9/3263* (2013.01); *H04L 2209/60* (2013.01)
USPC ............... 713/158; 380/277; 380/279; 726/5; 726/26

(58) Field of Classification Search
USPC ........... 713/156, 158, 175; 726/3, 6; 380/231, 380/277
See application file for complete search history.

(56) References Cited

U.S. PATENT DOCUMENTS

| | | | | |
|---|---|---|---|---|
| 7,370,196 | B2 * | 5/2008 | Simon | 713/156 |
| 8,327,424 | B2 * | 12/2012 | Ignaci et al. | 726/6 |
| 8,549,300 | B1 * | 10/2013 | Kumar et al. | 713/175 |
| 2002/0012432 | A1 * | 1/2002 | England et al. | 380/231 |
| 2009/0154704 | A1 * | 6/2009 | Farrugia et al. | 380/277 |
| 2010/0023760 | A1 * | 1/2010 | Lee et al. | 713/158 |
| 2013/0174222 | A1 * | 7/2013 | Ogle | 726/3 |

* cited by examiner

*Primary Examiner* — Dustin Nguyen
(74) *Attorney, Agent, or Firm* — Garlick & Markison; Bruce E. Stuckman

(57) ABSTRACT

A current version certificate is stored that includes a corresponding current version identifier. A current instance certificate is received from the certificate authority, wherein the current instance certificate includes the current version identifier of the current version certificate and a current instance public key corresponding to the current instance private key. The current instance certificate is sent to a local station, during a registration with the local station. A request is generated and sent to the local station. First encrypted data is received from the local station, wherein the first encrypted data includes a content key that is encrypted via the current instance public key.

19 Claims, 9 Drawing Sheets

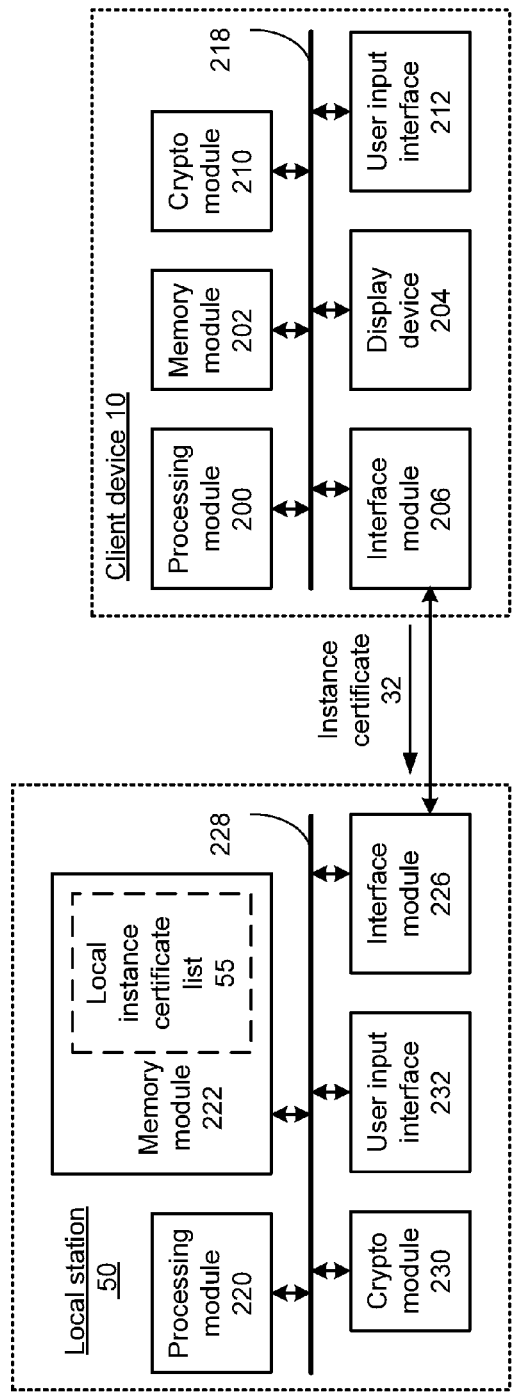

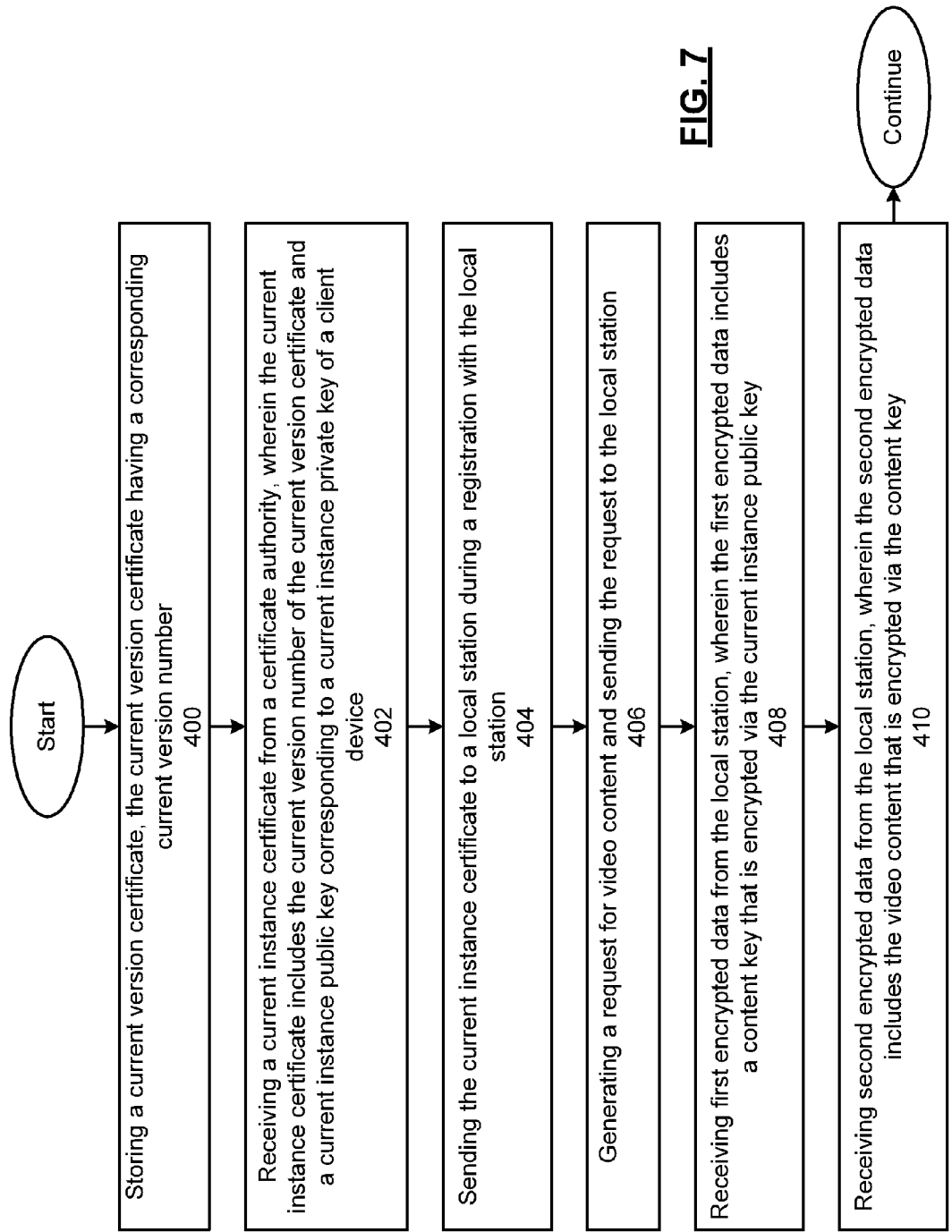

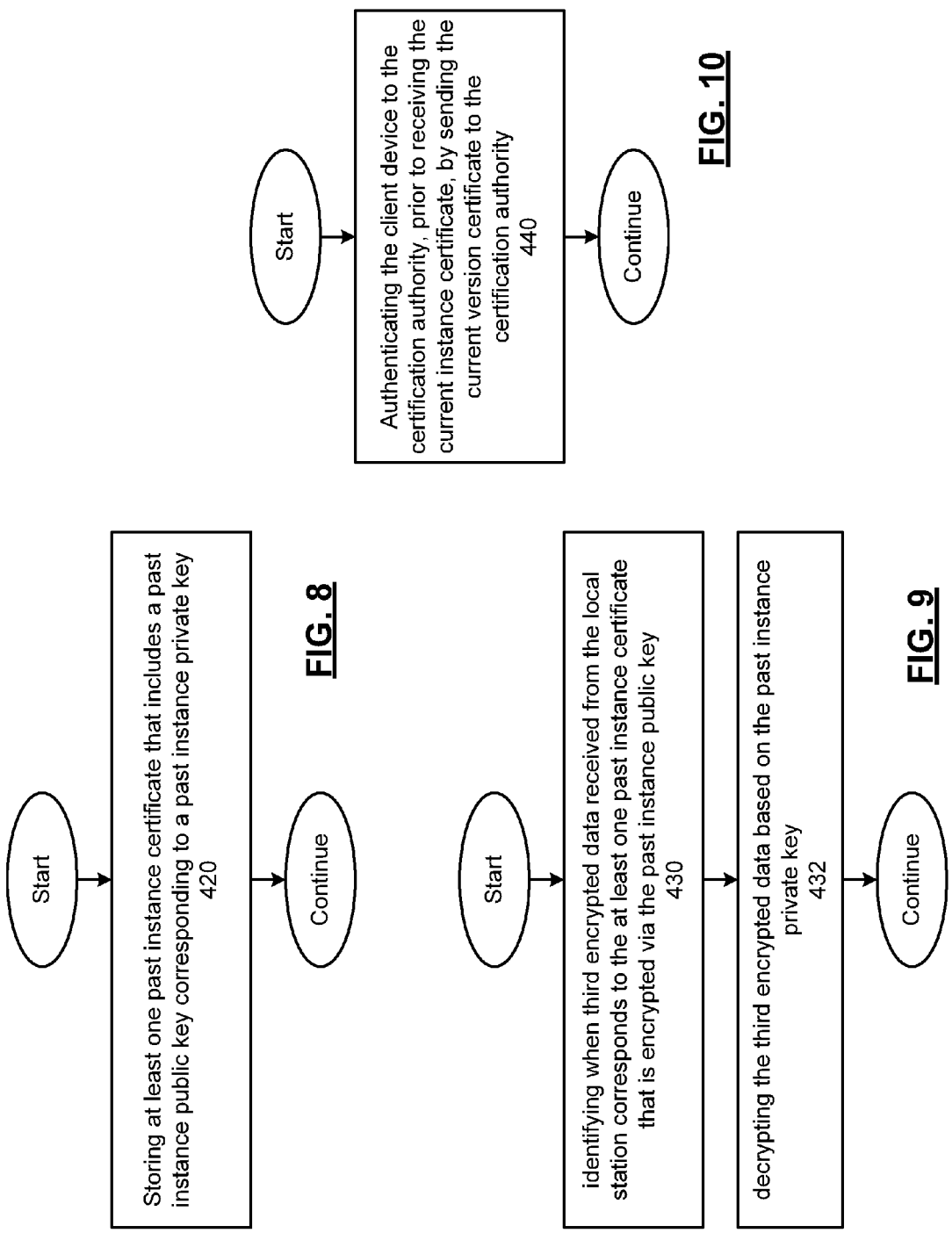

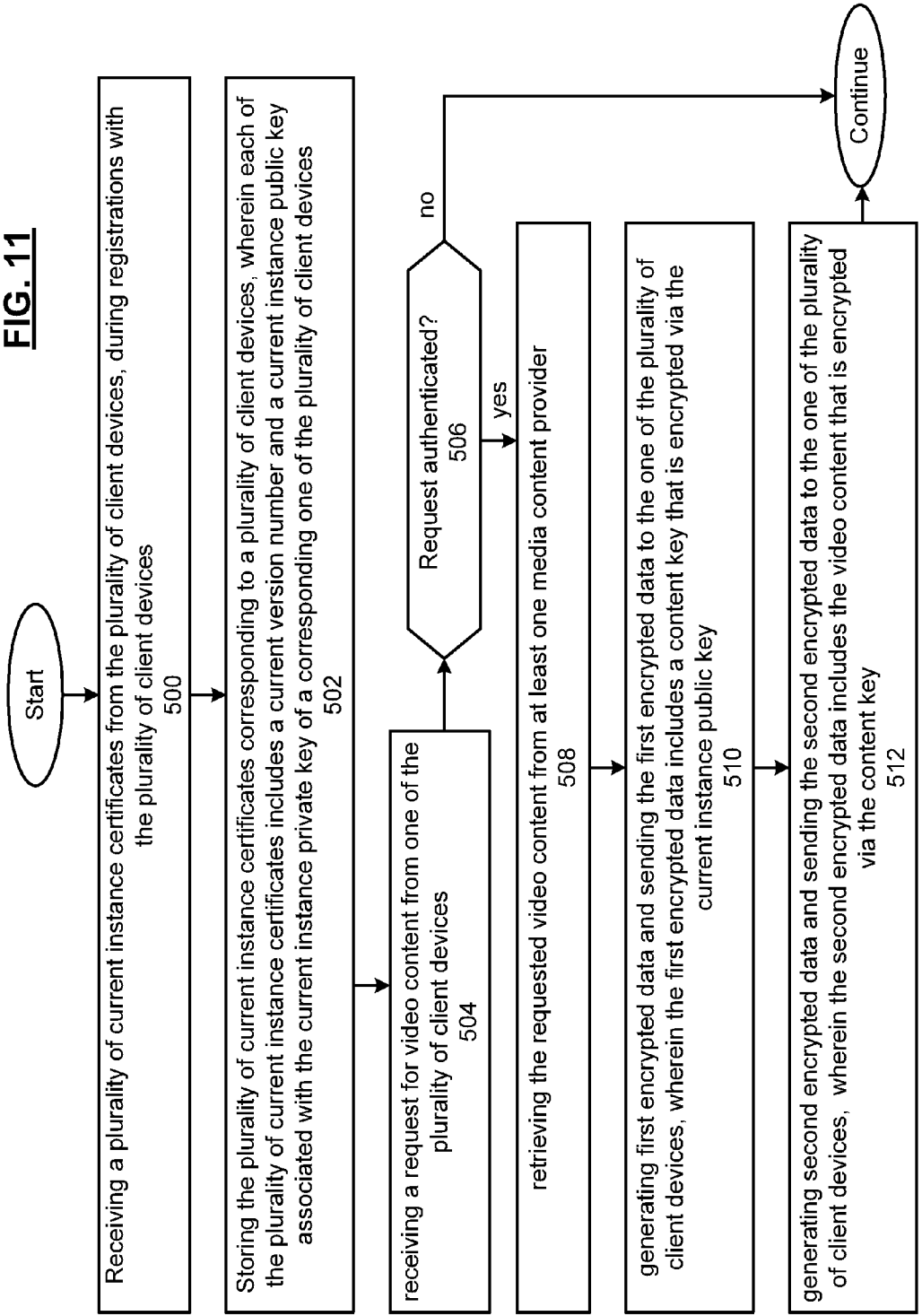

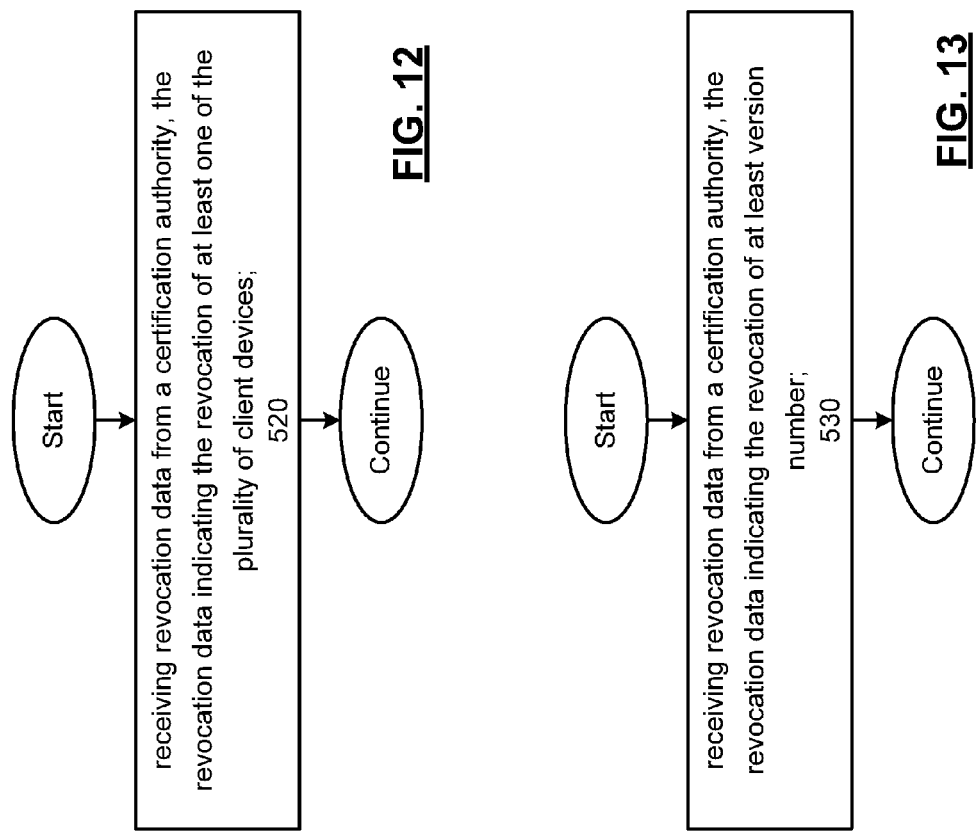

CLIENT DEVICE AND LOCAL STATION WITH DIGITAL RIGHTS MANAGEMENT AND METHODS FOR USE THEREWITH

CROSS REFERENCES TO RELATED APPLICATIONS

The present U.S. Utility Patent Application claims priority pursuant to 35 U.S.C. §120, as a continuation, to the following U.S. Utility Patent Application which is hereby incorporated herein by reference in its entirety and made part of the present U.S. Utility Patent Application for all purposes:
1. U.S. Utility application Ser. No. 13/027,032, entitled CLIENT DEVICE AND LOCAL STATION WITH DIGITAL RIGHTS MANAGEMENT AND METHODS FOR USE THEREWITH, filed Feb. 14, 2011, which issued as U.S. Pat. No. 8,458,459 on Jun. 4, 2013.

TECHNICAL FIELD OF THE INVENTION

The present invention relates to the digital rights management, and the distribution of protected content such as audio and video programming.

DESCRIPTION OF RELATED ART

The number of households having multiple television sets is increasing, and many users want the latest and greatest video viewing services. As such, many households have multiple satellite receivers, cable set-top boxes, modems, et cetera. For in-home Internet access, each computer or Internet device can have its own Internet connection. As such, each computer or Internet device includes a modem.

As an alternative, an in-home wireless local area network may be used to provide Internet access and to communicate multimedia information to multiple devices within the home. In such an in-home local area network, each computer or Internet device includes a network card to access an IP gateway. The gateway provides the coupling to the Internet. The in-home wireless local area network can also be used to facilitate an in-home computer network that couples a plurality of computers with one or more printers, facsimile machines, as well as to multimedia content from a digital video recorder, set-top box, broadband video system, etc.

Certain media content, such as movies, songs, and music albums can be protected by digital rights management techniques that are meant to restrict unlicensed copying of copyrighted materials. For instance, music compact disks (CDs), video cassettes and digital video disks (DVDs) are recorded with copy protection signals that are meant to prevent the media content contained on these media from being copied.

Video signals are frequently scrambled during transmission in order to protect the content from unauthorized reception and viewing. An authorized viewer is provided an encryption key that is used to descramble the video content for playback. If a hacker or other unauthorized person gains access to an encryption key, they are also able to descramble the video content for playback.

BRIEF DESCRIPTION OF THE SEVERAL VIEWS OF THE DRAWINGS

FIG. 3 presents a block diagram representation of client device 10 and local station 50 in accordance with an embodiment of the present invention.

FIG. 4 presents a block diagram representation of a local instance certificate list in accordance with an embodiment of the present invention.

FIG. 7 presents a flowchart representation of a method in accordance with an embodiment of the present invention.

FIG. 8 presents a flowchart representation of a method in accordance with an embodiment of the present invention.

FIG. 9 presents a flowchart representation of a method in accordance with an embodiment of the present invention.

FIG. 10 presents a flowchart representation of a method in accordance with an embodiment of the present invention.

FIG. 11 presents a flowchart representation of a method in accordance with an embodiment of the present invention.

FIG. 12 presents a flowchart representation of a method in accordance with an embodiment of the present invention.

FIG. 13 presents a flowchart representation of a method in accordance with an embodiment of the present invention.

DETAILED DESCRIPTION OF THE INVENTION INCLUDING THE PRESENTLY PREFERRED EMBODIMENTS

Figure 1:
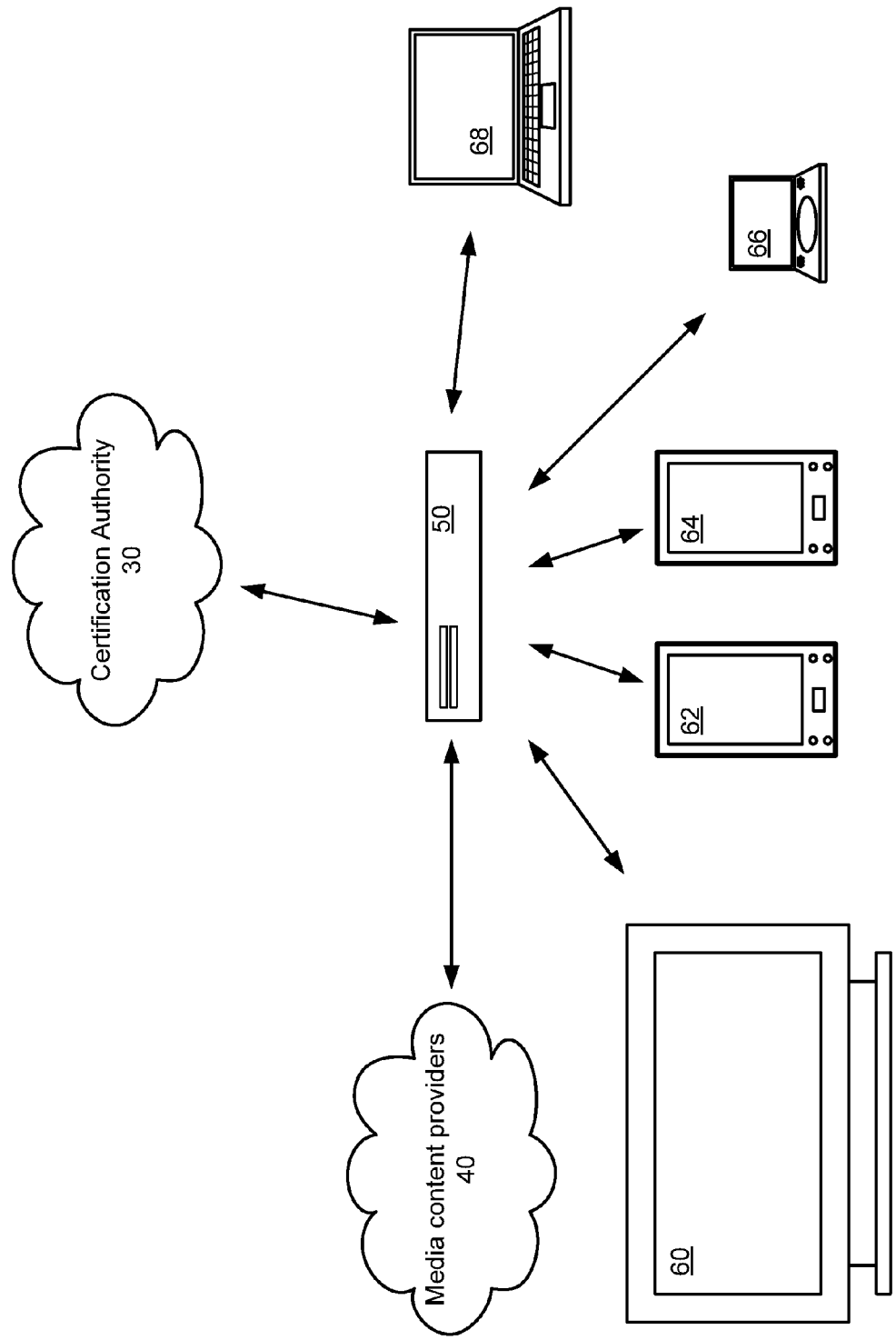
FIG. 1 presents a pictorial representation of a content distribution system that includes digital rights management in accordance with an embodiment of the present invention.

FIG. 1 presents a pictorial representation of a content distribution system that includes digital rights management in accordance with an embodiment of the present invention. In particular, a local station 50 is capable of accessing and distributing content from one or more content providers 40 to a plurality of client devices such as a television 60, smart phone, internet tablet or other personal media players 62 and 64, handheld video player 66, and personal computer 68. While specific client devices are shown, local station 50 is capable of accessing and distributing content from one or more content providers 40 to other client devices that can receive and reproduce media content from media content providers 40. The local station 50 can be a stand-alone device such as QewStation made available from Morega, Systems, Inc. or a router, set top box, digital video recorder, gateway or other device that includes the functionality attributed to local station 50 as described herein.

Local station 50 includes one or more device interfaces, such as a network card, port, data interface, wireless or wired modem or other transceiver or interface device for communicating with the media content providers 40, with the television 60, smart phone, internet tablet or other personal media players 62 and 64, handheld video player 66, personal computer 68, and further with certification authority 30. In particular, certification authority 30 operates in conjunction with local station 50 to implement a digital rights management (DRM) scheme for the media content distributed by local station 50 to the various client devices.

In one example of operation, the DRM operates based on a version certificate for each client device that is assigned by the certification authority 30 and stored in the client device. The version certificate includes a private key of a public key cryptography system. During setup and installation of the client device, another certificate, an instance certificate, is applied for and obtained by the client device from the certification authority 30. The instance certificate includes a public key corresponding the client device's private key along with a version identifier corresponding to, for example, a version number of the version certificate.

When a client device is activated, i.e. when its instance certificate is issued by the certification authority 30, it is able to register with a local station 50 in order to receive media content. The registration process involves providing its instance certificate to the local station 50 to be included in a local instance certificate list. Once the client device's instance certificate is listed with a local station 50, the client device is able to request and receive media content via the local station 50. For example, when the local station 50 wants to send media content to the client, it uses the public key included in the instance certificate listed for that device to encrypt a content key that is sent to the client device as encrypted data. The client device can decrypt the content key using its private key from its version certificate. When the local station 50 sends media content to the client device, the media content is encrypted with the content key so that only that specified client can read it. A number of client certificates can be added to that process; the cryptographic messaging syntax (CMS) set forth in the request for comments (RFC) 3852 of the Internet Engineering Task Force (IETF) can be used.

When a client device is upgraded with a new version certificate, it will be issued a new instance certificate. It can keep the old instance certificate with the old private key to be able to decrypt older content, that for example could be stored on the device.

In this configuration, the certificate authority 30 can revoke a client device's access in more than one way. For revocation of a specific client device, for example, when the device is reported as stolen or is no longer paying its bills, the certification authority 30 can add its instance certificate to a certificate revocation list that is sent to either a particular local station 50 or to all local stations in a network. In another case, where, for example, an entire version has been compromised by hackers, the entire version can revoked by revocation of the corresponding version number at each of the local stations including local station 50. Simultaneously, the certification authority 30 can stop issuing new instance certificates for that version.

The advantages of this DRM scheme includes the following:
  Revocation of an individual installation of a client (e.g. for not paying bills).
  Revocation of an entire build/version of clients (e.g. for being hacked)
  Binding of content to a group of clients for a particular local station 50
  Local station 50 will only talk with registered clients having valid instance certificates
  Client devices are still able to access old content after version upgrade
  The certification authority can enforce various security and business rules (account in good standing, valid credentials provided, service subscribed to etc.) before issuing the instance certificate.
  The ability of registered client devices to copy and share the same content with other registered client devices, without the need to re-encrypt it.

The local station 50, certification authority 30, and the client devices, such as television 60, smart phone, internet tablet or other personal media players 62 and 64, handheld video player 66, and personal computer 68, each include one or more features of the present invention described further in conjunction with FIGS. 2-13 that follow.

Figure 2:
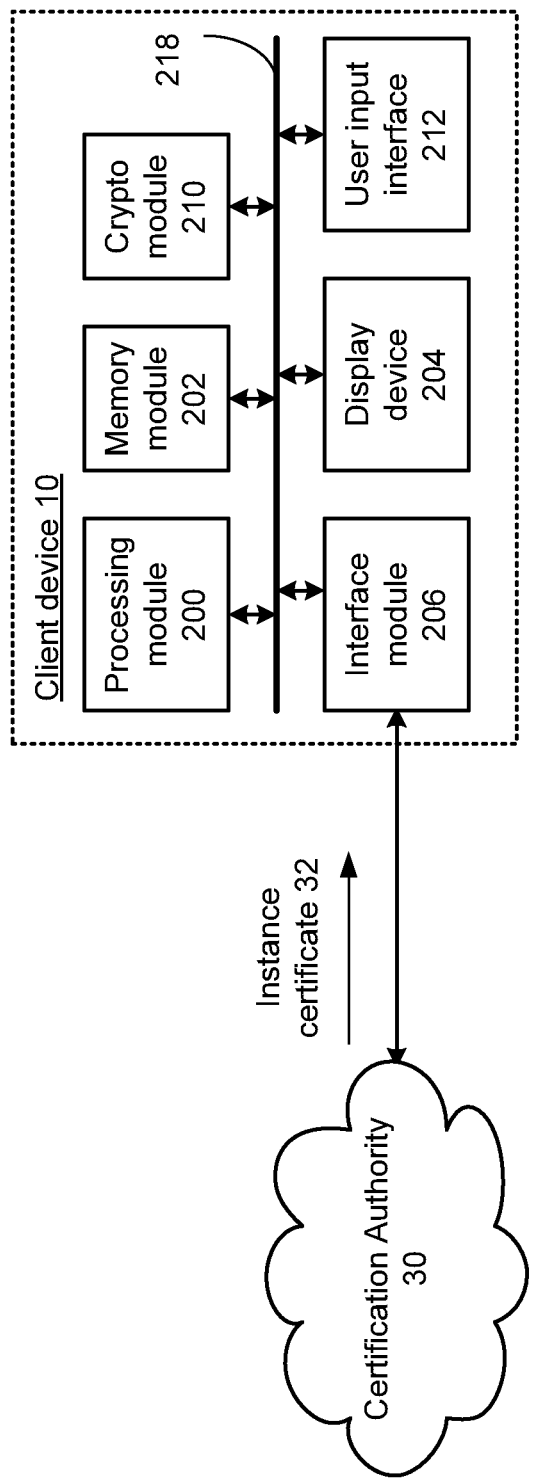
FIG. 2 presents a block diagram representation of client device 10 in accordance with an embodiment of the present invention.

FIG. 2 presents a block diagram representation of client device 10 in accordance with an embodiment of the present invention. Elements from prior figures are incorporated that are referred to by common reference numerals. In particular, a client device 10 is shown, such as television 60, smart phone, internet tablet or other personal media players 62 and 64, handheld video player 66 and/or personal computer 68. Client device 10 includes a processing module 200, memory module 202, cryptography module 210, interface module 206, display device 204 and user input interface 212, that are coupled via bus 218. While a particular bus architecture is shown, other architectures that include two or more buses and/or direct connectivity between one or more modules of client device 10 are also possible within the scope of the present invention. Further, client device 10 can optionally include additional modules and components, for instance, for performing additional functions and features of the device, depending on its implementation.

Client device 10 can be coupled to display video content on its own optional display device 204 such as a liquid crystal display, light emitting diode (LED) backlit display, or other display device, including speakers. In addition or in the alternative, the client device 10 optionally couples to an external display device such as computer monitor, television receiver, external speakers, headphones, et cetera. In an embodiment of the present invention, interface module 206 includes a wired link for coupling to local 50. The coupling can include a serial or parallel connection such as an Ethernet connection, Universal Serial Bus (USB) connection, an Institute of Electrical and Electronics Engineers (IEEE) 1394 (Firewire) connection, small computer serial interface (SCSI), high definition media interface (HDMI) connection or other wired connection that operates in accordance with either a standard or custom interface protocol.

In addition or in the alternative, the interface module 206 can include a wireless link for coupling to the local station 50 either directly or indirectly through one or more devices that operate in accordance with a wireless network protocol such as 802.11a,b,g,n (referred to generically as 802.11x), Bluetooth, Ultra Wideband (UWB), 3G wireless data connection, 4G wireless data connection or other wireless connection that operates in accordance with either a standard or custom interface protocol in order to communicate with one or more of these other devices.

In addition, interface module 206 can include a port, such as a card slot or other connection that is coupleable to a removable memory device such as a memory stick, memory card, flash memory device or other memory that transfers data via a digital data file. User input interface 212 includes one or more buttons, a keyboard, a touch pad, a touch screen, thumb wheel and/or other user interface devices that generate signals in response to the action of the user for allowing the user to interact with the device, by making selections, entering data, etc.

Processing module 200 can be implemented using a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory, such as memory module 202. Memory module 202 may be a single memory device or a plurality of memory devices. Such a memory device can include a hard disc drive or other disc drive, read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

Memory module 202 can store a resident video player application, user selections, preferences and other user attribute data, application data corresponding to other applications of the client device 10, the operating system, other software and firmware, and other data. Additionally, memory module 202 can store a plurality of compressed video files corresponding to stored instances of video content. As discussed above, memory module 202 can include a plurality of different memory devices such as random access memory (RAM), read only memory (ROM), and removable storage devices. In an embodiment of the present invention, memory module 202 includes a flash memory card, memory stick or other flash memory device.

Cryptography (crypto) module 210 operates one or more cryptography algorithms such as data encryption standard (DES), Rivest, Shamir, Adelman (RSA), elliptical curve cryptography (ECC) or other algorithm to assist in processing digital signatures or other certificates used in authenticating the client device 10, and further for decrypting data received from local station 50. Cryptography module 210 can be implemented via a stand alone processing device or via firmware or software stored in memory module 202 and executed via processing module 200.

Memory module 202 stores a current version certificate that includes a version public key of a public key cryptosystem having an associated version private key. The current version certificate has a corresponding current version identifier, such as a version number or other identifier, that can be used to quickly reference and distinguish the current version certificate from past and future version certificates. The version certificates can be signed by the certification authority for authentication purposes pursuant to a digital signature algorithm such as elliptic curve digital signature algorithm (ECDSA).

During setup and installation of the client device 10 or after the device has been upgraded with new software or firmware to include a new version certificate, an instance certificate, is applied for and obtained by the client device from the certification authority 30. The instance certificate 32 includes the current version identifier of the current version certificate, for example a version number or other identifier. The instance certificate 32 also includes a current instance public key corresponding to a current instance private key. The current instance private key can either be generated locally by cryptography module 210 or received from the certification authority 30. In addition, the instance certificate is also digitally signed by the certification authority for authentication purposes. In an embodiment of the present invention, the current version certificate can be embedded in an executable program such as cryptography utility, a video player application or other software or firmware in order to make the current version certificate more difficult to access by unauthorized parties. In the alternative, the current version certificate can be stored in a secure key storage module of memory module 202. It should be noted that both version and instance private keys can also be hidden or obfuscated using either a commercially available source code hardening technique, or a commercially available whitebox cryptography product.

In particular, the processing module 200 executes a routine that communicates with certification authority 30 to receive the instance certificate 32. For example, the interface module 206 can access the certification authority 30 via an internet connection, such as a secure socket layer (SSL) internet connection or other secure connection. The client device 10 shares its current version certificate with the certification authority 30 for purposes of authenticating the client device 10 to the certification authority 30 and further to receive an instance certificate 32 that corresponds to the current version certificate.

When a client device 10 is upgraded with a new version certificate, a new instance certificate can be applied for and issued in a similar fashion. Client device 10 can keep the old instance certificate and version certificate with the old private key to be able to decrypt older content. As will be discussed further in conjunction with FIG. 6, content received from the local station 50 using the old instance certificate could be stored in memory module 202 for later playback via the client device 10.

The process of obtaining or re-obtaining the instance certificate 32 can follow a number of protocols. In one example, the client device 10 generates an instance private key, as well as a certificate request (e.g. a certificate signing request as set forth in the PKCS#10 specification as defined by RSA labs). The certificate request is sent to the certification authority 30, which signs it and sends back a signed certificate. In another example, the client device 10 applies for a certificate, and the certification authority generates an instance private key and a certificate for the client. Both the instance private key and the instance certificate are sent back to the client over a secure channel.

The instance and/or version certificates can be X.509 certificates, as defined in IETF RFC 2459. The certificates can be used directly in transport layer security (TLS) protocol as defined in IETF RFC 2246, or other secure channels. As discussed, the version certificate can be used to authenticate the client device 10 to the certification authority 30 during the certificate request process; and the instance certificate can be used to authenticate the client device 10 to the local station 50, or other components of the system (such as a remote server), after the client device has been activated.

Further use of the instance certificate by the client device 10, including several optional functions and features will be discussed in conjunction with FIGS. 3-13 that follow.

FIG. 3 presents a block diagram representation of client device 10 and local station 50 in accordance with an embodiment of the present invention. Elements from prior figures are incorporated that are referred to by common reference numerals. Local station 50 includes a processing module 220, memory module 222, cryptography module 230, interface module 226, and user input interface 232, that are coupled via bus 228. While a particular bus architecture is shown, other architectures that include two or more buses and/or direct connectivity between one or more modules of local station 50 are also possible within the scope of the present invention. Further, local station 50 can optionally include additional modules and components, for instance, for performing additional functions and features of the device, depending on its implementation.

In an embodiment of the present invention, interface module 226 includes a wired link for coupling local station 50 to any of the client devices 10. The coupling can include a serial or parallel connection such as an Ethernet connection, Universal Serial Bus (USB) connection, an Institute of Electrical and Electronics Engineers (IEEE) 1394 (Firewire) connection, small computer serial interface (SCSI), high definition media interface (HDMI) connection or other wired connection that operates in accordance with either a standard or custom interface protocol. In addition or in the alternative, the interface module 226 can include a wireless link for the local station 50 to any of the client devices 10, either directly or indirectly through one or more devices that operate in accordance with a wireless network protocol such as 802.11a,b,g,n (referred to generically as 802.11x), Bluetooth, Ultra Wideband (UWB), 3G wireless data connection, 4G wireless data connection or other wireless connection that operates in accordance with either a standard or custom interface protocol. The interface module 226 can also include a wired or wireless connection for coupling local station 50 to certification authority 30 and further to one or more media content providers via an internet connection, cable network, telephone network, or other network connection.

In addition, interface module 226 can include a port, such as a card slot or other connection that is coupleable to a removable memory device such as a memory stick, memory card, flash memory device or other memory for transferring data via a digital data file. User input interface 232 includes one or more buttons, a keyboard, a touch pad, a touch screen, thumb wheel and/or other user interface devices that generate signals in response to the action of the user of local station 50 for allowing the user to interact with the device, by making selections, entering data, etc.

Processing module 220 can be implemented using a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory, such as memory module 222. Memory module 222 may be a single memory device or a plurality of memory devices. Such a memory device can include a hard disc drive or other disc drive, read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

Memory module 222 can store a local station application, user selections, preferences and other user attribute data, and application data corresponding to other applications of the local station 50, the operating system, other software and firmware, and other data. Additionally, memory module 222 can store a plurality of compressed video files corresponding to stored instances of video content. As discussed above, memory module 222 can include a plurality of different memory devices such as random access memory (RAM), read only memory (ROM), and removable storage devices. In an embodiment of the present invention, memory module 222 includes a flash memory card, memory stick or other flash memory device.

Cryptography (crypto) module 230 operates one or more cryptography algorithms such as data encryption standard (DES), Rivest, Shamir, Adelman (RSA), elliptical curve cryptography (ECC) or other algorithm to assists in processing digital signatures or other certificates used in authenticating the local station 50 and communications from other devices, and further for encrypting data that is sent to any of the client devices 10. Cryptography module 230 can be implemented via a stand alone processing device or via firmware or software stored in memory module 222 and executed via processing module 220.

When a client device 10 is activated, i.e. when its instance certificate is issued by the certification authority 30, it is able to register with local station 50 in order to receive media content via that local station. The registration process involves a client device 10 providing its instance certificate 32 to the local station 50 to be included in its local instance certificate list 55. As discussed in conjunction with FIG. 2, the instance certificate 32 was signed by the certification authority 30. In an embodiment of the present invention, the processing module 220 operates in conjunction with cryptography module 230 to authenticate the instance certificate 32 as originating from the certificate authority 30, as a precondition for including the instance certificate 32 on the local instance certificate list 55 of memory module 222.

FIG. 4 presents a block diagram representation of a local instance certificate list in accordance with an embodiment of the present invention. Elements from prior figures are incorporated that are referred to by common reference numerals. In particular, the local instance certificate list 55 includes a plurality of instance certificates 32 corresponding to the client devices 10 that have been successfully registered with the local station 50. As previously discussed, each instance certificate includes both the current instance public key for the client device as well as a current version identifier that identifies the current version of the version certificate of the client device. While the instance certificate is shown as a single field in the local instance certificate list 55, the current instance public key and current version number could be stored separately or otherwise separately indexed to facilitate faster public key retrieval, and faster deregistration of client devices 10 based on revoked versions. As shown, the local instance certificate list 55 can optionally correlate each instance certificate to a device identifier of the corresponding client device, such as a name, number or other identifier.

The local instance certificate list 55 can also optionally correlate each instance certificate to one or more additional certificates that can be securely shared between local station 50 and each particular client device 10. For example, once a client device's instance certificate 32 is authenticated, local station 50 can generate one or more additional certificates for that device that are particular to the pairing between the local station 50 and a particular client device 10. The client device's public key can be used to encrypt these additional certificates so that they can be sent securely to the particular client device 10. These additional certificates can be used, for example, to authenticate requests for content and other communications from the client device 10.

As shown, the local instance certificate list 55 can also optionally correlate each instance certificate to a status indicator that indicates, for example whether the instance certificate is active or whether the registration of the client device has been revoked, for example a revocation for a particular client device or group of client devices by the certification authority 30 due to non-payment of bills, due to a wider revocation by the certification authority 30 of a particular version, due to expiration of an instance certificate, or due to other revocation. While the statuses shown in the local instance certificate list 55 include "active" and "revoked" status can further include an optional expiration date, a status, such as "expiring in 3 days", a particular revocation status, such as "revoked for non-payment", etc. Further, while the status field is shown as an alphanumeric field, number codes likewise can be used to represent each allowed status condition.

Once the client device's instance certificate 32 is listed with a local station 50, the client device 10 is able to request and receive media content via the local station 50. It should be noted that the local station can optionally send all or portions of the local instance certificate list 55 to a remote server (not shown) for tracking purposes via a secure internet connection established between the local station 50 and remote server. Optional additional certificates may or may not be included in versions of the local instance certificate list 55 sent to the remote server.

Figure 5:
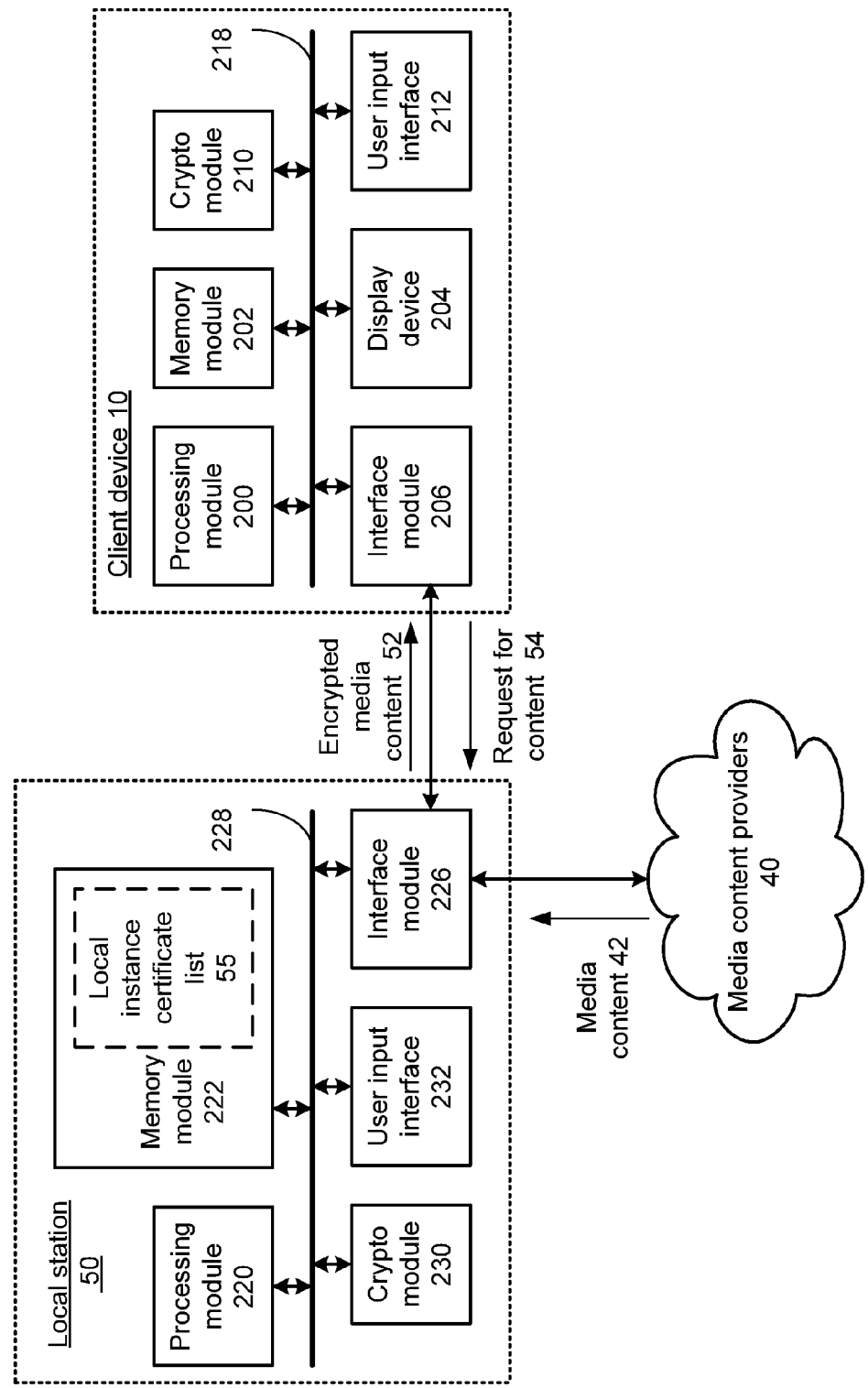
FIG. 5 presents a block diagram representation of client device 10 and local station 50 in accordance with an embodiment of the present invention.

FIG. 5 presents a block diagram representation of client device 10 and local station 50 in accordance with an embodiment of the present invention. Elements from prior figures are incorporated that are referred to by common reference numerals. In this exchange, the client device 10 can issue a request for content 54. The request for content 54, generated via processing module 200 in response to user input received via user input interface 212, can include an indication of the particular content requested, an identification of particular client device 10, information regarding the display capabilities of the client device 10 and/or the desired format of the content, a particular media content provider 40 and other optional data corresponding to the request. Client device 10 can optionally employ cryptography module 210 to sign the request for content 54 in order to allow local station 50 to verify that the request for content originated from client device 10.

The request for content 54 is encoded as data that is communicated from client device 10 to local station 50 via interface modules 206 and 226. The data corresponding to the request for content 54 is interpreted by processing module 220 and authenticated. The processing module 220 accesses the local instance certificate list 55 in response to the request. The authentication can include verification of the client device's signature via cryptography module 230 to determine that the request originated from a valid client device 10. The authentication can also include determining if the local instance certificate of the requesting client device 10 is active or has been revoked. When the request for content 54 is authenticated, processing module 220 optionally identifies a particular media content provider to fulfill the request, based on the particular content requested, an identification of a particular media content provider 40 included in the request, a determination of the availability of a particular media content provider 40 or based on other factors such as costs, time of retrieval, etc. Processing module 220 communicates with the particular media content provider 40 via interface module 226 to receive the media content 42. It should be noted that media content 42 may be encrypted by media content provider 40 for transmission to local station 50, in which case, cryptography module 230 operates to decrypt the media content 42.

If the request for content 54 cannot be authenticated, either because the client device 10 cannot be authenticated, or because the current instance certificate for that client device has been revoked, the request for content 54 is either ignored or in the case where the current instance certificate has been revoked, a return message can be generated by processing module 220 and sent to client device 10 via interface modules 226 and 206 indicating the revoked status and optionally prompting the user to contact the certification authority 30 or other service provider.

Processing module 220 optionally operates to transcode the media content 42. For example, in the instance where the media content 42 includes a digital video signal, the transcoding can include changing the compression format, frame rate, resolution, color depth, aspect ratio, or other parameters of the digital video signal from the format as received into a format suitable for or otherwise requested by the particular client device 10.

The processing module 220 retrieves the public key of the client device 10 from the local instance certificate list 55. The processing module first generates or retrieves a content key to be used to encrypt the content. The cryptography module 230 generates encrypted data by encrypting the content key via the public key. Processing module 220 formats and sends the encrypted data for transmission to the client device 10 via interface modules 226 and 206. The processing module 200 commands the cryptography module 210 to decrypt the encrypted data via the private key included in the current version certificate of client device 10. The decrypted content key can then be stored in memory module 202 for use in decrypting the encrypted content to follow.

The cryptography module 230 generates additional encrypted data that includes encrypted content 52. In particular, cryptography module 230 encrypts or re-encrypts the media content 42, after optional transcoding, via the content key. Processing module 220 formats and sends the encrypted data 52 for transmission to the client device 10 via interface modules 226 and 206. The processing module 200 commands the cryptography module 210 to decrypt the encrypted data 52 via the received content key.

It should be noted that the processing module 220 can encrypt the content key using one or more other instance public keys corresponding to one or more other client devices 10 associated with a local station 50. In this mode of operation, the content key and encrypted data 52 can be securely shared between a group of client devices 10 associated with a local station 50. Each client device 10 is able to decrypt the encrypted data 52 using its own private key to decrypt the content key. In this fashion, media content for a plurality of client devices 10, associated with a particular user or group of users, can be bound together and accessed by the entire group or any subset thereof, based on the particular subset of the instance public keys used to encrypt the content key. Registered client devices 10 can copy and share the same content with other registered client devices 10, without the need to re-encrypt it.

The encrypted content 52 can include one or more video signals, optionally including associated audio signals that are either real-time signals in digital format or data files that contain video signals in a digital format. In general, such a video signal can be in a digital format such as a Motion Picture Experts Group (MPEG) format (such as MPEG1, MPEG2 or MPEG4), Quicktime format, Real Media format, H.264 format, Windows Media Video (WMV) or Audio Video Interleave (AVI), or another digital video format, either standard or proprietary. For instance, encrypted content 52 can include content from a broadcast video signal, such as a high definition television signal, enhanced high definition television signal or other digital broadcast video signal that has been transmitted over a wireless medium, either directly or through one or more satellites or other relay stations or through a cable network, optical network, IP television network, or other transmission network. Further, encrypted content 52 include a digital audio/video file, transferred from a storage medium such as a server memory, magnetic tape, magnetic disc or optical disc, or can included a streaming audio or video signal that is transmitted over a public or private network such as a wireless or wired data network, local area network, wide area network, metropolitan area network or the Internet.

Client device 10 can be coupled to display video content from encrypted content 52 on its own optional display device 204 display device such as a liquid crystal display, light emitting diode (LED) backlit display, or other display device, including speakers. In addition or in the alternative, the client device 10 optionally couples to an external display device such as computer monitor, television receiver, external speakers, headphones, et cetera. In an embodiment of the present invention, interface module 206 includes a wired link for coupling to media content provider 40 to transfer the encrypted content 52 either directly or through one or more intermediate devices. The coupling can include a serial or parallel connection such as an Ethernet connection, Universal Serial Bus (USB) connection, an Institute of Electrical and Electronics Engineers (IEEE) 1394 (Firewire) connection, small computer serial interface (SCSI) connection or other wired connection that operates in accordance with either a standard or custom interface protocol.

While described above, in conjunction with a specific request for content 54, local station 50 may automatically send content to a particular client device 10, under certain circumstances such as a scheduled broadcast, push transaction, repeating request or other scenario. Further, while a two stage approach is described above whereby local station uses a client device's public key to encrypt a content key that is used by local station 50 in encrypting the encrypted content 52. In a more direct approach, the encrypted content 52 can be directly encrypted via the public key of the particular client device 10, provided that the encryption algorithm employed, the computational resources of cryptography module 210 and the timing associated with delivery of the media content 42 allow direct decryption. Such a direct approach can be employed in non-streaming applications, or circumstances where cryptography module 210 can decrypt the encrypted signal 52 using the cryptography system associated directly with the version certificate and instance certificate at a sufficient speed to facilitate real-time processing.

Figure 6:
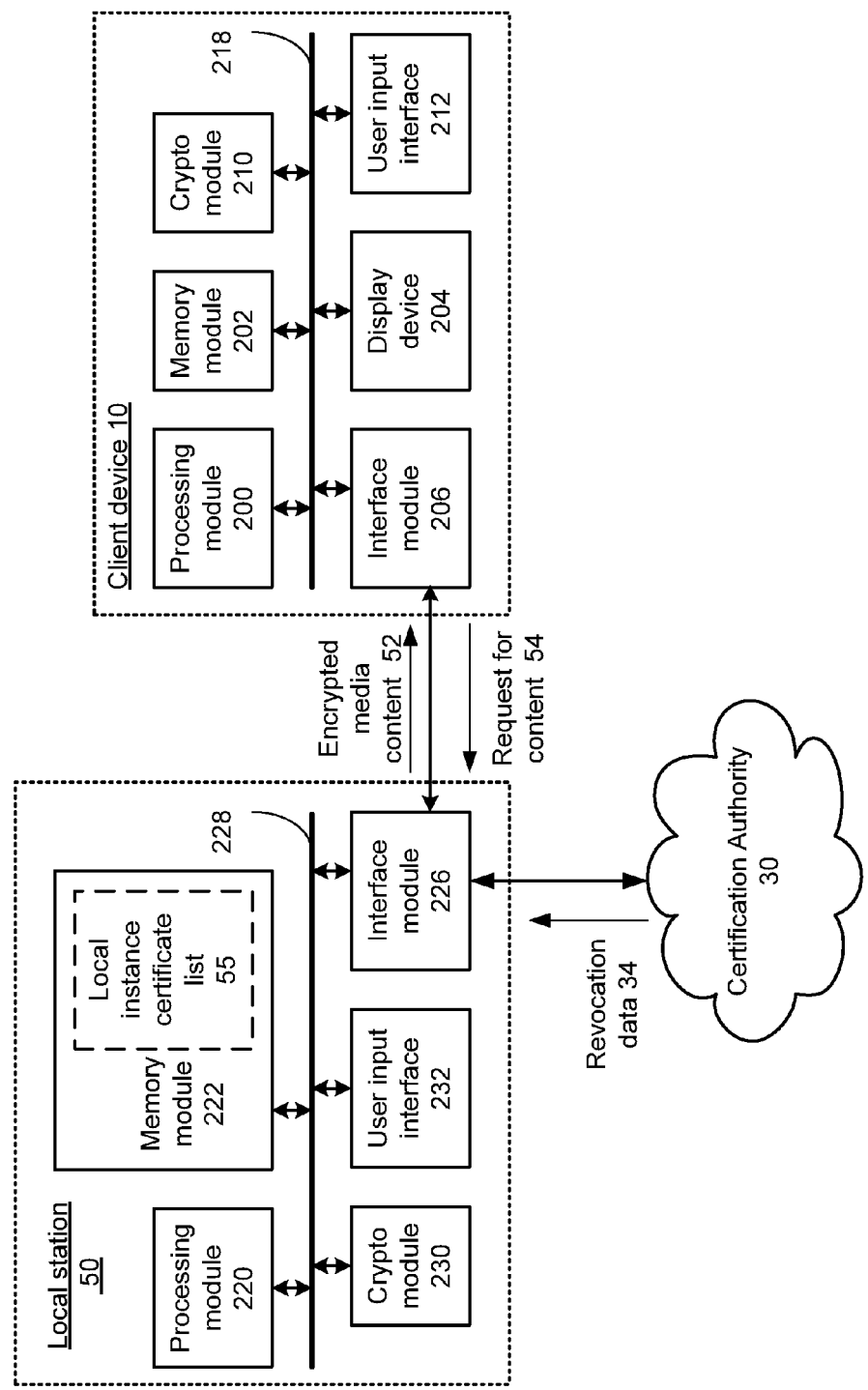
FIG. 6 presents a block diagram representation of client device 10 and local station 50 in accordance with an embodiment of the present invention.

FIG. 6 presents a block diagram representation of client device 10 and local station 50 in accordance with an embodiment of the present invention. Elements from prior figures are incorporated that are referred to by common reference numerals. As previously discussed, the certificate authority 30 can revoke a client device's access to content in more than one way. For revocation of a specific client device, for example, when a client device is reported as stolen or is no longer paying its bills, the certification authority 30 can add its instance certificate to a certificate revocation list that is sent to either a particular local station 50 or to all local stations in a network as revocation data 34. For example, the certificate revocation list can be implemented in accordance with the X.509 standard, as per request for comments (RFC) 5280 of the Internet Engineering Task Force.

In another case, where, for example, an entire version has been compromised by hackers, the entire version can revoked by sending revocation data 34 to all local stations including local stations 50 that indicates revocation of all version certificates having that corresponding version identifier. Simultaneously, the certification authority 30 can stop issuing new instance certificates to client devices 10 having version certificates of that version. In either case, the local instance certificate list 55 is updated based on the revocation data 34 to indicate a revoked status of one or more devices, based on the particular instance certificates that are revoked or the particular instance certificates that indicate a corresponding version identifier that has been revoked.

As discussed in conjunction with FIG. 5, when a request for content 54 is received it is authenticated. Processing module 220 accesses the local instance certification list 55 to determine if the local instance certificate of the requesting client device 10 is active or has been revoked. If the request for content 54 cannot be authenticated, either because the current instance certificate or the current version certification for that client device has been revoked, the request is either ignored or a return message can be generated by processing module 220 and sent to client device 10 via interface modules 226 and 206 indicated the revoked status and optionally prompting the user to contact the certification authority 30 or other service provider.

When a client device 10 is upgraded with a new version certificate, a new instance certificate can be applied for and issued in a similar fashion as discussed in conjunction with FIG. 2. Client device 10 can keep the old instance certificate and version certificate with the old private key to be able to decrypt older content. In the event that media content 42 has been requested and received via a previous instance certificate and stored in memory module 202, client device 10 is still able to decrypt and play that content. In particular, memory module 202 stores the current instance certificate along with one or more past instance certificates, each past instance certificate including a past instance public key corresponding to an earlier version certificate having an earlier version identifier than the current version identifier. The processing module 220 identifies when encrypted data received via communications from the local station 50 corresponds to one of the past instance certificate that is encrypted via a past instance public key. The cryptography module 210 decrypts this encrypted data based on the past instance private key.

FIG. 7 presents a flowchart representation of a method in accordance with an embodiment of the present invention. In particular a method is presented for use in conjunction with one or more functions and features described in conjunction with FIGS. 1-6, such as via a client device 10. In step 400 a current version certificate is stored that includes a current version public key of a public key cryptosystem, the current version certificate having a corresponding current version identifier. In step 402, a current instance certificate is received from a certificate authority, wherein the current instance certificate includes the current version identifier of the current version certificate and a current instance public key corresponding to the client's current instance private key. In step 404, the current instance certificate is sent to a local station, during a registration with the local station. In step 406, a request for video content is generated and the request is sent to the local station. In step 408, first encrypted data is received from the local station, wherein the first encrypted data includes a content key that is encrypted via the current instance public key. In step 410, second encrypted data is received from the local station, wherein the second encrypted data includes the video content that is encrypted via the content key.

In an embodiment of the present invention, the current instance certificate and the current version certificate are signed by the certification authority.

FIG. 8 presents a flowchart representation of a method in accordance with an embodiment of the present invention. In particular a method is presented for use in conjunction with one or more functions and features described in conjunction with FIGS. 1-7. In step 420, at least one past instance certificate is stored that includes a past instance public key corresponding to a past instance private key.

FIG. 9 presents a flowchart representation of a method in accordance with an embodiment of the present invention. In particular a method is presented for use in conjunction with one or more functions and features described in conjunction with FIGS. 1-8. In step 430, the method identifies when third encrypted data received from the local station corresponds to the at least one past instance certificate that is encrypted via the past instance public key. In step 432, the third encrypted data is decrypted based on the past instance private key, when the third encrypted data corresponds to the at least one past instance certificate that is encrypted via the past instance public key.

FIG. 10 presents a flowchart representation of a method in accordance with an embodiment of the present invention. In particular a method is presented for use in conjunction with one or more functions and features described in conjunction with FIGS. 1-9. In step 440, the client device is authenticated to the certification authority, prior to receiving the current instance certificate, by sending the current version certificate to the certification authority.

FIG. 11 presents a flowchart representation of a method in accordance with an embodiment of the present invention. In particular a method is presented for use in conjunction with one or more functions and features described in conjunction with FIGS. 1-10. In step 500, a plurality of current instance certificates are received from a plurality of client devices, during registrations with the plurality of client devices. In step 502, the plurality of current instance certificates corresponding to the plurality of client devices are stored, wherein each of the plurality of current instance certificates includes a current version identifier and a current instance public key associated with the current instance private key of a corresponding one of the plurality of client devices. In step 504, a request is received for video content from one of the plurality of client devices. In decision block 506, the method accessing one of the plurality of current instance certificates corresponding to the one of the plurality of client devices and determines if the request is authenticated, based the one of the plurality of current instance certificates. When the request is authenticated, the method proceeds to step 508, to retrieve the requested video content from at least one media content provider; to step 510 to generate first encrypted data and sending the first encrypted data to the one of the plurality of client devices, wherein the first encrypted data includes a content key that is encrypted via the current instance public key; and to step 512 to generate second encrypted data and sending the second encrypted data to the one of the plurality of client devices, wherein the second encrypted data includes the video content that is encrypted via the content key.

In an embodiment of the present invention, the current instance certificate is signed by a certification authority.

It should also be noted that, in step 510, the content key can also be encrypted by one or more other public keys corresponding to one or more other client devices associated with a local station.

FIG. 12 presents a flowchart representation of a method in accordance with an embodiment of the present invention. In particular a method is presented for use in conjunction with one or more functions and features described in conjunction with FIGS. 1-11. In step 520, revocation data is received from a certification authority, the revocation data indicating the revocation of at least one of the plurality of client devices. In particular, authenticating a request for content can include determining when the one of the plurality of current instance certificates has not been revoked.

In an embodiment of the present invention, the revocation data includes a certificate revocation list implemented in accordance with the X.509 standard, as per request for comments (RFC) 5280 of the Internet Engineering Task Force.

FIG. 13 presents a flowchart representation of a method in accordance with an embodiment of the present invention. In particular a method is presented for use in conjunction with one or more functions and features described in conjunction with FIGS. 1-12. In step 530, revocation data is received from a certification authority, the revocation data indicating the revocation of at least one version identifier. In particular, authenticating a request for content can include determining when the current version identifier included in the one of the plurality of current instance certificates, has not been revoked.

In preferred embodiments, optional circuit components can be implemented using 0.35 micron or smaller CMOS technology. Provided however that other circuit technologies, both integrated or non-integrated, may be used within the broad scope of the present invention.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As the term module is used in the description of the various embodiments of the present invention, a module includes a functional block that is implemented in hardware, software, and/or firmware that performs one or module functions such as the processing of an input signal to produce an output signal. As used herein, a module may contain submodules that themselves are modules.

Thus, there has been described herein an apparatus and method, as well as several embodiments including a preferred embodiment, for implementing a media distribution system with digital rights management. Various embodiments of the present invention herein-described have features that distinguish the present invention from the prior art.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

What is claimed is:

1. A client device comprising:
a memory for storing a current version certificate, the current version certificate having a corresponding current version;
at least one device interface for communications to and from a certification authority and a local station;
a processing module, coupled to the memory and the at least one device interface, that:
receives a current instance certificate, via the communications from the certificate authority, wherein the current instance certificate includes a current version identifier of the current version certificate and a current instance public key corresponding to a current instance private key;
sends the current instance certificate, via the communications to the local station, during a registration with the local station;
generates a request and sends the request via the communications to the local station; and
receives first encrypted data in response to the request, via the communications from the local station, wherein the first encrypted data includes a content key that is encrypted via the current instance public key.

2. The client device of claim 1 wherein the processing module further receives second encrypted data via the communications from the local station, wherein the second encrypted data includes media content, corresponding to the request, that is encrypted via the content key.

3. The client device of claim 2 wherein the memory further stores the current instance certificate along with at least one past instance certificate, that includes a past instance public key corresponding to an earlier version certificate having an earlier version identifier than the current version identifier.

4. The client device of claim 3, wherein the processing module identifies when third encrypted data received via communications from the local station corresponds to the at least one past instance certificate that is encrypted via a past instance public key, and wherein the client device further includes a cryptography module that decrypts the third encrypted data based on the past instance private key of the earlier version certificate.

5. The client device of claim 1 wherein the current instance certificate is signed by the certification authority.

6. The client device of claim 1 wherein the current version certificate is signed by the certification authority.

7. The client device of claim 1 wherein the processing module authenticates the client device to the certification authority, prior to receiving the current instance certificate, by including the current version certificate in the communications to the certification authority.

8. A local station comprising:
a memory for storing a plurality of current instance certificates corresponding to a plurality of client devices, wherein each of the plurality of current instance certificates includes a current version identifier and a current instance public key associated with a current instance private key of a corresponding one of the plurality of client devices;
at least one device interface, for communication to and from the plurality of client devices, a certification authority and at least one media content provider;
a processing module, coupled to the memory and the at least one device interface, that:
receives the plurality of current instance certificates, via the communications from the plurality of client devices, during registrations with the plurality of client devices;
receives a request for media content, via the communication from one of the plurality of client devices;
retrieves one of the plurality of current instance certificates corresponding to the one of the plurality of client devices;
authenticates the request based the one of the plurality of current instance certificates;
when the request is authenticated:
retrieves the requested media content via the communication with the at least one media content provider; and
generates first encrypted data and sends the first encrypted data via the communication to the one of the plurality of client devices, wherein the first encrypted data includes a content key that is encrypted via the current instance public key.

9. The local station of claim 8, wherein the processing module further:
generates second encrypted data and sends the second encrypted data via the communications to the one of the plurality of client devices, wherein the second encrypted data includes the media content that is encrypted via the content key.

10. The local station of claim 8, wherein the processing module receives revocation data via the communications from the certification authority, the revocation data indicating the revocation of at least one of the plurality of client devices, and
wherein the processing module authenticates the request by determining when the one of the plurality of current instance certificates has been revoked.

11. The local station of claim 8, wherein the processing module receives revocation data via the communications from the certification authority, the revocation data indicating the revocation of at least one version identifier, and
wherein the processing module authenticates the request by determining when the current version identifier included in the one of the plurality of current instance certificates, has been revoked.

12. The local station of claim 8 wherein the current instance certificate is signed by the certification authority.

13. A method for use in a client device, the method comprising:
storing a current version certificate, the current version certificate having a corresponding current version identifier;
receiving a current instance certificate from a certificate authority, wherein the current instance certificate includes the current version identifier of the current version certificate and a current instance public key corresponding to a current instance private key of the client device;
sending the current instance certificate to a local station, during a registration with the local station; and
generating a request and sending the request to the local station; and
receiving first encrypted data from the local station, wherein the first encrypted data includes a content key that is encrypted via the current instance public key.

14. The method of claim 13, wherein the request corresponds to media content and the method further comprises:

receiving second encrypted data from the local station, wherein the second encrypted data includes the media content that is encrypted via the content key.

15. The method of claim 14 further comprising:

storing at least one past instance certificate that includes a past instance public key corresponding to a past private key.

16. The method of claim 15, further comprising:

identifying when third encrypted data received from the local station corresponds to the at least one past instance certificate that is encrypted via the past instance public key, and decrypting the third encrypted data based on the past private.

17. The method of claim 13 wherein the current instance certificate is signed by the certification authority.

18. The method of claim 13 wherein the current version certificate is signed by the certification authority.

19. The method of claim 13 further comprising:

authenticating the client device to the certification authority, prior to receiving the current instance certificate, by sending the current version certificate to the certification authority.

\* \* \* \* \*